United States Patent Office 3,088,947
Patented May 7, 1963

---

3,088,947
BENZOYLCARBINOL-AMINOACETATES
Piernicola Giraldi and Willy Logemann, Milan, Italy, assignors to Carlo Erba S.p.A., Milan, Italy, a corporation of Italy
No Drawing. Filed Nov. 28, 1961, Ser. No. 155,457
Claims priority, application Italy Dec. 19, 1960
8 Claims. (Cl. 260—247.2)

Benzoylcarbinol and some esters of its, such as acetate, trimethylacetate etc. are known to show an appreciable activity in capillary defence (Logemann & Giraldi, Ztschr. f. Physiol. Chemie 289, 19, 1951; 290, 61, 1952; 292, 58, 1953; U.S. Pat. 2,892,865).

These esters however are limited in the therapeutic application by their insolubility in water, which makes their administration by intravenous route quite impossible.

Aim of this invention is the preparation of benzoylcarbinol basic esters, which become soluble in water by salification. Said products have general formula:

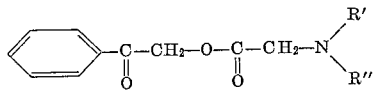

where R' and R" can be either identical or different from each other, and represent linear or branched alkyl groups, or H or can be a part of a heterocyclic ring.

They can be prepared by reaction of
(a) Benzoylcarbinol with a halogen-acetylhalogenide in presence of a hydrohalogenic acid acceptor and successive reaction of the condensation product with an excess of amine or ammonia;
(b) Benzoylcarbinol with the product of the following formula:

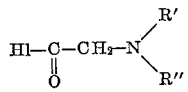

where R' and R" have the aforementioned meaning and Hl represents an halogen, in presence of a hydrohalogenic acid acceptor;
(c) Halogen-acetophenones with a product of the following formula:

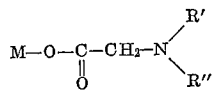

where M is an alkaline or alkaline-earthen metal;
(d) Benzoylcarbinol with halogen-acetylhalogenide in presence of a hydrohalogenic acid acceptor, as per (a), and successive reaction with urotropin and final hydrolysis.
(e) Halogen-acetophenone with a product of the following formula:

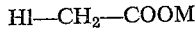

Hl—CH₂—COOM where M is halogen, M is either an alkaline or alkaline-earthen metal, and successive reaction of halogen-acetyl-benzoylcarbinol with an excess of amine or ammonia.

After salification with inorganic acids (such as HCl, $H_2SO_4$, $H_3PO_4$ etc.) or organic acids (such as tartaric, citric, maleic, methanesulfonic, ascorbic acids etc.), these products are easily soluble in water and after injection split up gradually releasing benzoylcarbinol as active product.

The following examples show but do not limit this invention.

Example 1

10 g. benzoylcarbinol and 6.4 pyridine are dissolved in 50 cc. chloroform and added with 16.3 g. bromoacetyl-bromide. The mixture is allowed to stay for 2 hours.

The chloroform layer is then washed with hydrochloric acid, dried on sodium sulfate and chloroform is evaporated.

5 g. bromoacetyl-benzoylcarbinol are dissolved in benzene and added with 4 g. morpholine, then stirred for about 3 hours. The precipitate formed is filtered, the solution is evaporated and the residue is crystallized from benzene-petroleum-ether, resulting in benzoylcarbinol-morpholino-acetate.

Similar products are also obtained by this way, i.e. by reaction of bromoacetyl-benzoylcarbinol with other amines, such as methyl-morpholine, aminomorpholine, isopropylamine, cyclohexylamine, pyrrolidine etc.

Example 2

10 g. benzoylcarbinol and 6.4 g. pyridine are dissolved in 50 cc. dioxane and added with 12 g. chloroacetyl-N-morpholine.

The solution is stirred for about 3 hours, then poured in water and the precipitate formed is filtered. Benzoylcarbinol morpholino-acetate crystallizes from ligroin.

Example 3

To 10 g. bromoacetophenone dissolved in 40 cc. acetone are added under stirring 8.4 g. morpholino-acetate sodium salt, and 0.1 g. sodium iodide are added as a catalyzer. The mixture is refluxed for 2 hours, then the acetone solution is filtered and concentrated. The residue crystallizes from ligroin, resulting in benzoylcarbinol-morpholino-acetate.

Example 4

10 g. benzoylcarbinol-chloroacetate are dissolved in 10 cc. chloroform and added with 10.3 g. urotropin; the precipitate formed is filtered and dissolved in alcohol, added with concentrated HCl.

The precipitate formed after stirring is filtered, resulting in benzoylcarbinol-2-aminoacetate.

Example 5

10 g. benzoylcarbinol-morpholino-acetate are added with 100 cc. of an aqueous solution containing the stoichiometric amount of tartaric acid, resulting in a complete solution with about pH 4.

Benzoylcarbinol - morpholino - acetate tartrate, easily soluble in water, is obtained as a solid product by lyophilization or solvent evaporation. A similar process is employed to obtain other salts with citric, ascorbic or with other organic or inorganic acids such as hydrochloric, sulfuric acid etc.

Example 6

9.5 g. of potassium-chloroacetate are suspended in 360 cc. of dry acetone and added with a solution containing 10 g. of chloro-acetophenone dissolved in 40 cc. of dry acetone. The solution is refluxed for 48 hours, then dissolved and poured into water and the precipitate is crystallized from trieline so obtaining chloro-acetyl-benzoylcarbinol. (M.P. 99–100° C.)

4.1 g. of chloro-acetyl-benzoylcarbinol are dissolved in benzene and added with 4 g. of morpholine. The solution is stirred for about 3 hours. The precipitate formed is filtered, the solution is evaporated and the residue is crystallized from benzene-petroleum-ether, so obtaining benzoylcarbinol-morpholino-acetate. (M.P. 59–60° C.)

We claim:
1. Benzoylcarbinol-morpholino-acetate.
2. Benzoylcarbinol-aminoacetate.
3. Benzoylcarbinol-morpholino-acetate tartrate.
4. Benzoylcarbinol-morpholino-acetate ascorbate.
5. Benzoylcarbinol-morpholino-acetate hydrochloride.
6. Benzoylcarbinol-aminoacetate tartrate.
7. Benzoylcarbinol-aminoacetate ascorbate.
8. Benzoylcarbinol-aminoacetate hydrochloride.

References Cited in the file of this patent

UNITED STATES PATENTS 2,543,764    Cusic _____ Mar. 6, 1951

OTHER REFERENCES

Giraldi: "Farmaco" (Pavia), Ed. Sci., volume 14, pages 90–5 (1959).